United States Patent
Hickey et al.

(10) Patent No.: US 11,847,486 B1
(45) Date of Patent: Dec. 19, 2023

(54) CAPACITY RESOLVER FOR POINT OF PRESENCE (POP) SYSTEMS

(71) Applicant: Netskope, Inc., Santa Clara, CA (US)

(72) Inventors: Michael R. Hickey, Seattle, WA (US); Madhu J. Sharma, Ottowa (CA); Naiming Chu, Los Altos, CA (US); Scott M. Leibrand, Woodinville, WA (US); Jonathan M. Bosanac, Ennis, MT (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/162,566

(22) Filed: Jan. 31, 2023

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
CPC .................. G06F 9/45558; G06F 2009/4557
See application file for complete search history.

(56) References Cited

U.S. PATENT DOCUMENTS

| 2014/0359283 | A1* | 12/2014 | Lee | G06F 9/45533 |
| | | | | 713/165 |
| 2017/0235591 | A1* | 8/2017 | Kanada | G06F 21/53 |
| | | | | 714/6.23 |
| 2018/0095855 | A1* | 4/2018 | Sanakkayala | G06F 11/1438 |
| 2021/0144517 | A1* | 5/2021 | Guim Bernat | H04L 9/0637 |
| 2022/0021738 | A1* | 1/2022 | Patel | H04L 43/20 |

* cited by examiner

*Primary Examiner* — Kenneth Tang
(74) *Attorney, Agent, or Firm* — MUGHAL GAUDRY & FRANKLIN PC

(57) ABSTRACT

A capacity resolver system for provisioning and management of nodes at point of presence (POP) in a cloud-based multi-tenant system. The capacity resolver system includes a plurality of POPs and a cloud orchestration server. The POPs include hypervisors that include a plurality of nodes. The cloud orchestration receives a request for provisioning a node. The request is provisioned at the POP based on parameters from the hypervisors of the POP. The parameters include Central Processing Unit (CPU) Core utilization, memory utilization, disk utilization and Virtual File System (VFS) availability of the node. A triggering of one or more parameters above their respective threshold values is determined at the POP. Nodes are identified for downsizing or migration based on the triggering of the one or more parameters. The node is provisioned at the hypervisor of the POP in accordance with a priority for the downsizing or the migration of the nodes.

20 Claims, 13 Drawing Sheets

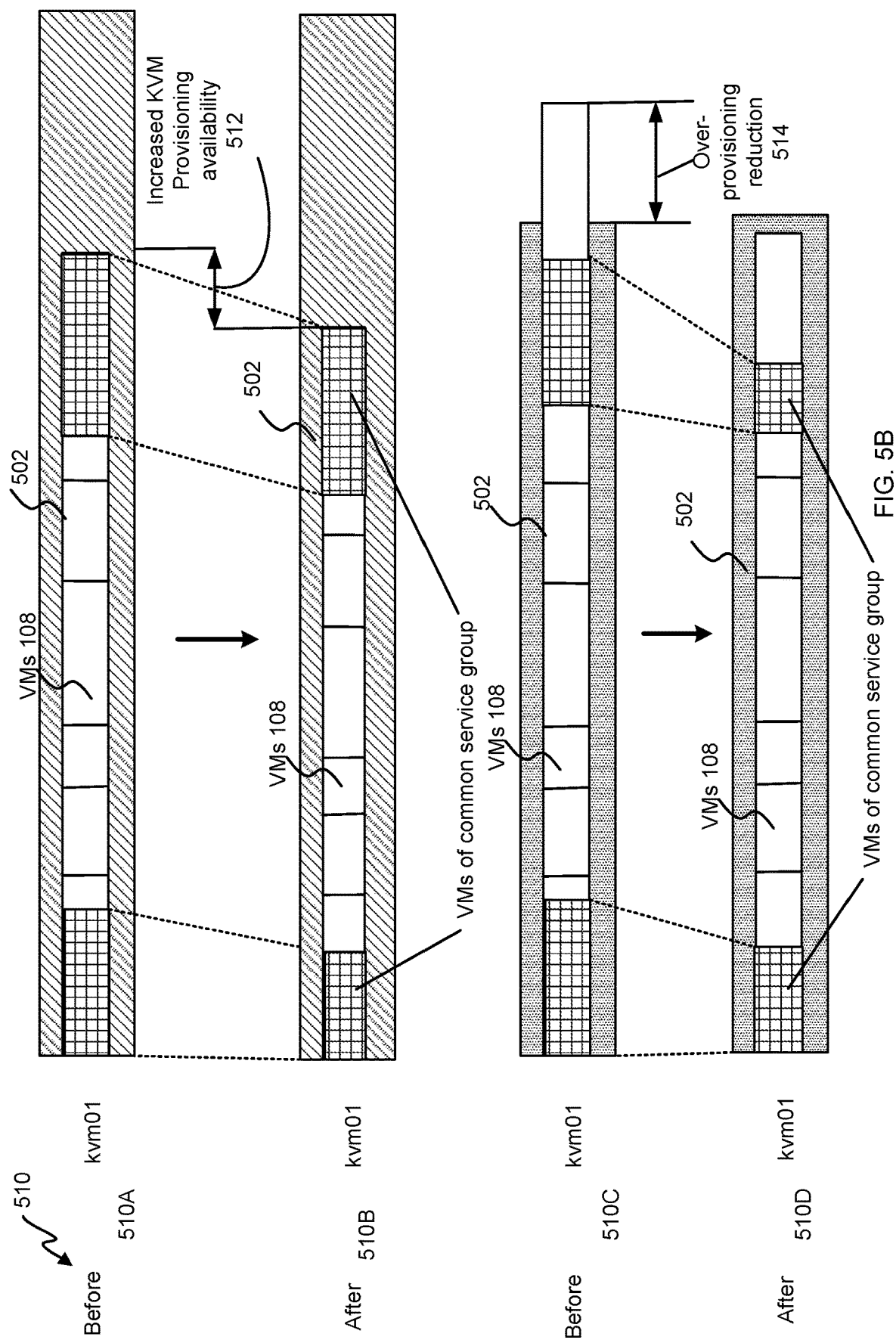

CAPACITY RESOLVER FOR POINT OF PRESENCE (POP) SYSTEMS

BACKGROUND

This disclosure relates in general to capacity management at point of presence (POP) systems and, not by way of limitation, to provisioning virtual machines at the POP systems based on one or more utilization parameters, among other things.

Data centers or POPs often face problems related to over-provisioning of virtual machines (VMs) which can cause a risk to its operations. Resolving requests for placing new nodes at existing data centers can be burdensome and slow. Further, VM configurations at new data centers are often not optimal. This leads to error-prone and non-deterministic handling of requests at the POPs.

Solutions for capacity management and scheduling are available. However, the complex environment of the data centers demands an ad hoc solution. Previously, methods for resolution of capacity-related problems were handled in a semi-manual process taking into account provisioning metrics, utilization, failover considerations, and dozens of boundary conditions.

Moreover, efficiently allocating virtual machines has become a key cost-saving challenge. In order to increase overall controller and memory utilization, a more optimal and sustainable VM allocation strategy entails to be built. This entails data sets that represent accurate, updated and comprehensive metrics associated with VM provisioning and utilization.

SUMMARY

In one embodiment, the present disclosure provides a capacity resolver system for provisioning and management of nodes at point of presence (POP) in a cloud-based multi-tenant system. The capacity resolver system includes a plurality of POPs and a cloud orchestration server. The POPs include hypervisors that include a plurality of nodes. The cloud orchestration receives a request for provisioning a node. The request is provisioned at the POP based on parameters from the hypervisors of the POP. The parameters include provisioning availability and utilization of Central Processing Unit (CPU) Cores and memory in addition to disk availability and Virtual File System (VFS) availability of the node. A triggering of one or more parameters above their respective threshold values is determined at the POP. Nodes are identified for downsizing or migration based on the triggering of one or more parameters. The node is provisioned at the hypervisor of the POP in accordance with a priority for the downsizing or the migration of the nodes.

In an embodiment, a capacity resolver system for provisioning and management of nodes at point of presence (POP) systems in a cloud-based multi-tenant system. The capacity resolver system includes a plurality of POPs and a cloud orchestration server. The plurality of POPs includes a plurality of hypervisors. The plurality of hypervisors includes a plurality of nodes. The cloud orchestration server is configured to receive a request for provisioning a node in a POP of the plurality of POPs. The request is provisioned at the POP based on a plurality of parameters. The cloud orchestration server receives the plurality of parameters from the plurality of hypervisors of the POP. The plurality of parameters includes Central Processing Unit (CPU) Core utilization, memory utilization, disk utilization and Virtual File System (VFS) availability of the plurality of nodes of a hypervisor. A determination is made if there is a triggering of one or more parameters from the plurality of parameters at the POP. The determination of the triggering of the one or more parameters includes a determination of the one or more parameters that are above respective threshold values. A condition for downsizing or migration of one or more nodes of the plurality of nodes based on the triggering of the one or more parameters is identified. A priority for the downsizing or the migration of the one or more nodes based on the condition is identified. The node is provisioned at the hypervisor of the POP based on the downsizing or the migration of the one or more nodes in accordance with the priority.

In another embodiment, a method for capacity management of nodes at point of presences (POPs) in a cloud-based multi-tenant system. A cloud orchestration server is configured to receive a request for provisioning a node in a POP of a plurality of POPs. The request is provisioned at the POP based on a plurality of parameters. The cloud orchestration server receives the plurality of parameters from the plurality of hypervisors of the POP. The plurality of parameters includes Central Processing Unit (CPU) Core utilization, memory utilization, disk utilization and Virtual File System (VFS) availability of the plurality of nodes of a hypervisor. A determination is made if there is a triggering of one or more parameters from the plurality of parameters at the POP. The determination of the triggering of the one or more parameters includes a determination of the one or more parameters that are above respective threshold values. A condition for downsizing or migration of one or more nodes of the plurality of nodes based on the triggering of the one or more parameters is identified. A priority for the downsizing or the migration of the one or more nodes based on the condition is identified. The node is provisioned at the hypervisor of the POP based on the downsizing or the migration of the one or more nodes in accordance with the priority.

In yet another embodiment, a capacity resolver system for managing capacity of nodes at point of presence (POPs) systems based on boundary conditions, the capacity resolver system comprising a plurality of servers, collectively having code for:
  receiving a request at a cloud orchestration server for provisioning a node in a POP, wherein: the request is provisioned at the POP based on a plurality of parameters, the cloud orchestration server receives the plurality of parameters from a plurality of hypervisors of the POP, and the plurality of parameters includes Central Processing Unit (CPU) Core utilization, memory utilization, disk utilization and Virtual File System (VFS) availability of a plurality of nodes of a hypervisor;
  determining if there is a triggering of one or more parameters from the plurality of parameters at the POP, wherein determining triggering of the one or more parameters includes determining if the one or more parameters are above respective threshold values;
  identifying a condition for downsizing or migration of one or more nodes based on the triggering of the one or more parameters;
  identifying a priority for the downsizing or the migration of the one or more nodes based on the condition; and
  provisioning the node at the hypervisor of the POP based on the downsizing or the migration of the one or more nodes in accordance with the priority.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 5A-5C illustrates a graphical representation of capacity management of VMs in KVM;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
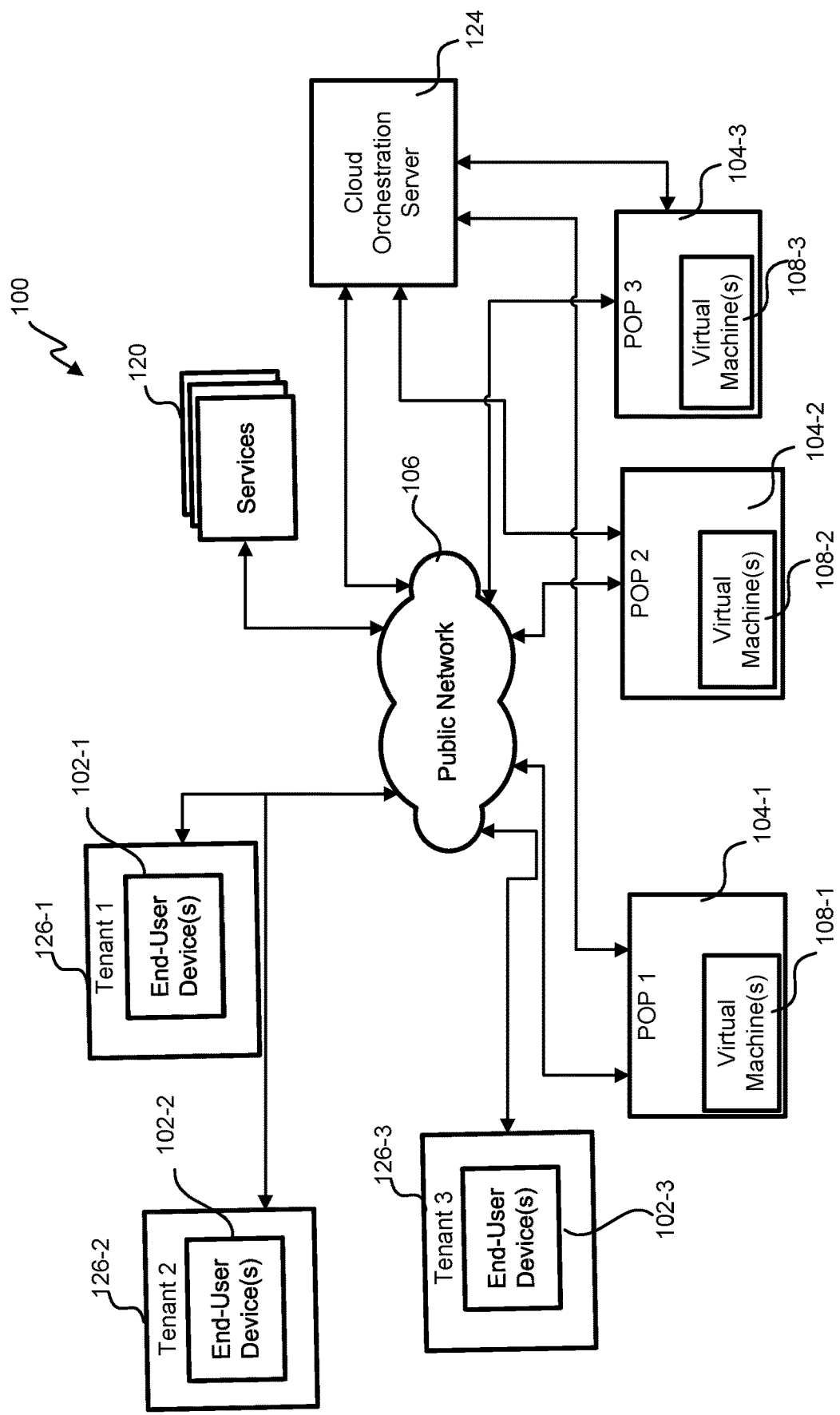
FIGS. 1A-1B illustrates a block diagram of an embodiment of a capacity resolver system 100 in a cloud-based multi-tenant system/environment.

Referring to the FIG. 1A, a block diagram of a capacity resolver system 100 in a cloud-based multi-tenant system/environment is shown. The presence of a multi-tenant environment helps in handling security, quality of service compliance, service level agreement enforcement, service request metering, and other management activities relating to the capacity resolver system 100. The capacity resolver system 100 includes an end-user device(s) 102 (102-1, 102-2, 102-3), Point of Presence (POP) 104 (104-1, 104-2, 104-3), a public network 106, virtual machines 108 (108-1, 108-2, 108-3), services 120, a cloud orchestration server 124, and tenants 126 (126-1, 126-2, 126-3). The end-user device(s) 102 such as smartphones, tablets, PCs and any other computers communicate with the cloud orchestration server 124 using the public network 106. The POP 104 remotely hosts the software environment that is secured. The POP 104 are data centers of enterprises. The end-user device(s) 102 runs on any popular operating system (OS) such as Windows™, iOS™, Android™, Linux, set-top box OSes, and Chromebook™ Third-party apps are applications running on the operating system of the end-user device(s) 102. The POP 104 includes hypervisors (not shown) and the virtual machines 108 of the hypervisors. The virtual machines may also be referred to as nodes.

Respective POP 104-1, 104-2, and 104-3 are present at different geographical locations. The geographical locations can be located in different regions, states/countries. The respective POP 104-1, 104-2, and 104-3 are connected and can provide their status to one another. The status of the POP 104 can include an indicator that the POP 104 is overloaded, working properly/unavailable/offline/available, etc.

The end-user device(s) 102 and the POPs 104 are connected via the public network 106. Further, individual POPs 104 communicate with one another using the public network 106. The end-user device(s) 102 use content and processing for content sites, for example, websites, streaming content, etc., and the services 120 for example, SaaS tools, databases, cloud service providers, etc.

The capacity resolver system 100 receives requests for VM placement in the POPs 104. VM represent virtual machine(s) (VMs). The capacity resolver 100 extracts the specifics of the request, reconciles with the existing VM configuration, and provides recommendations for VM placement(s) along with any VM migrations and/or downsizings that are necessary to create sufficient space in the POP 104 to accommodate the VM 108.

Figure 1B:
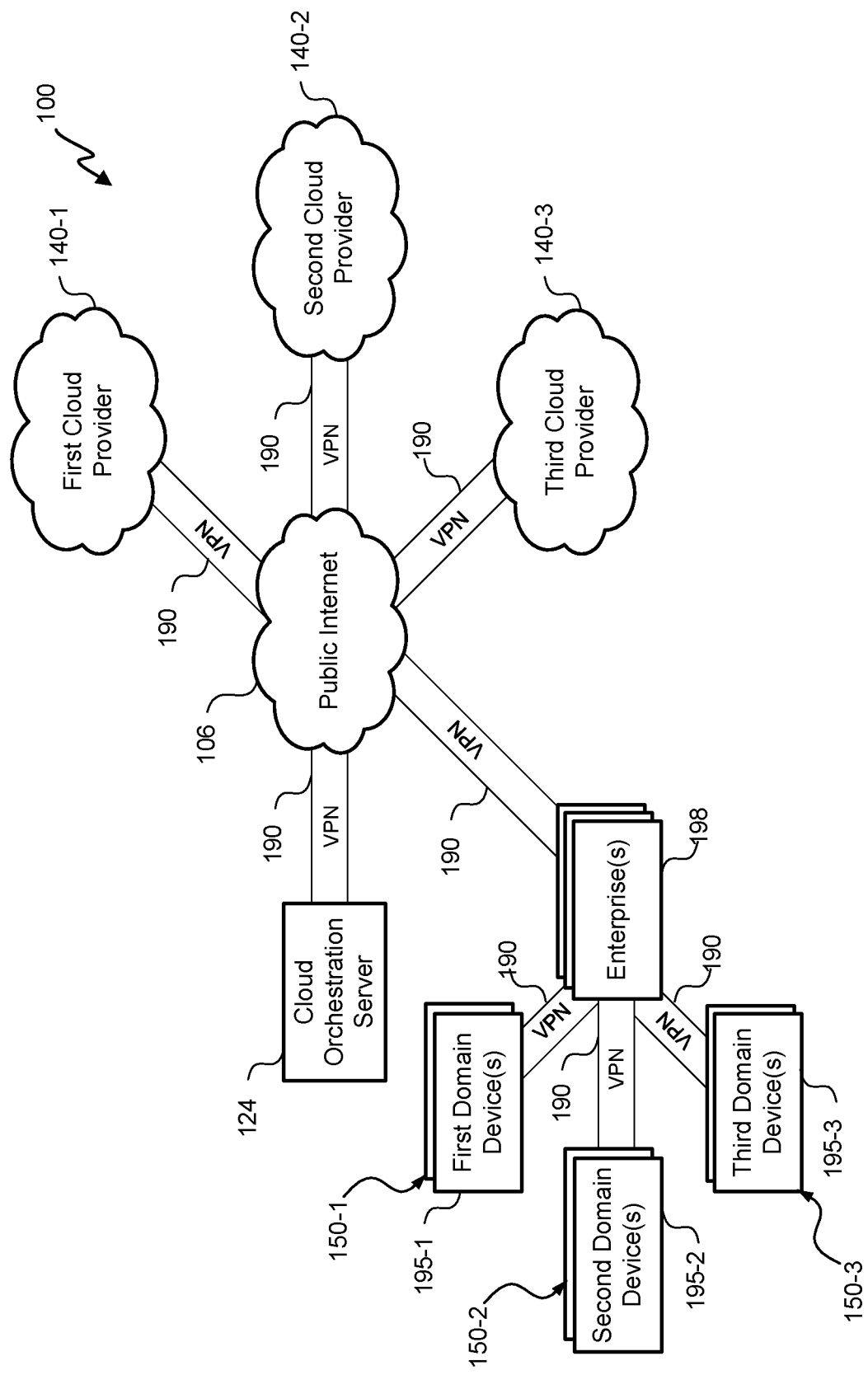

Mechanisms for configuration improvement by the capacity resolver system 100 There are two types of concerns with existing VM configurations: KVMs have over-provisioned resources (CPU cores, RAM, disk, and/or VFS). KVMs have insufficient resource availability for migration or provisioning of new VMs. Correspondingly, there are two mechanisms by which the capacity resolver system 100 recommends improvements:
Service Downsizing
VM Migration Referring to FIG. 1B, a block diagram of an embodiment of the capacity resolver system 100 is shown. The capacity resolver system 100 allows multiple tenants in different domains to communicate with various cloud providers over the public internet 106. The capacity resolver system 100 may be a multi-tenant cloud-based system or a single-tenant cloud-based system. The capacity resolver system 100 includes a plurality of servers. The capacity resolver system 100 allows multiple tenants/multi-tenant systems or enterprise(s) 198 to use the same network separated by domain or some other logical separation. Encryption, leased/encrypted tunnels, firewalls, and/or gateways can be used to keep the data from one enterprise(s) 198 separate from other enterprise(s) 198. Individual end-user device(s) 195 of an end-user(s) 122 can communicate with the cloud orchestration server 124 for services and storage using the public internet 106. The cloud orchestration server 124 provides multi-tenancy control, policies, and node provisioning and placement for individual domain data centers.

The capacity resolver system 100 may include a first computing environment 150-1 having end-user devices 195-1 for a first domain, a second computing environment 150-2 having end-user devices 195-2 for a second domain, and a third computing environment 150-3 having end-user devices 195-3 for a third domain. Individual domain communicates with its respective enterprise(s) 198 using a virtual private network (VPN) 190 over local area networks (LANs), wide area networks (WANs), and/or the public Internet 106. Instead of the VPN 190 as an end-to-end path, tunneling (e.g., Internet Protocol in Internet Protocol (IP-in-IP), Generic Routing Encapsulation (GRE)), policy-based routing (PBR), Border Gateway Protocol (BGP)/Interior Gateway Protocol (IGP) route injection, or proxies could be used. The POP 104 or the data center provides site-to-site optimized connectivity for critical apps and traffic (especially voice/video). Cloud providers 140 for providing remote services may include public or private clouds including Web/Software as a service (SaaS), SASE gateway public/private data center, and voice/video connected to the cloud orchestration server 124 via VPN 190. Enterprise(s) 198 are connected to the cloud orchestration server 124 using the VPN 190. Some examples of the cloud provider(s) 140 include Amazon Web Services (AWS)®, Google Cloud Platform (GCP)®, and Microsoft Azure®. Some or all of the cloud provider(s) 140 may be different from each other, for example, the first cloud provider 140-1 may run Amazon Web Services (AWS)®, the second cloud provider 140-2 may run Google Cloud Platform (GCP)®, and the third cloud provider 140-3 may run Microsoft Azure®. Although three cloud provider(s) 140 are shown, any suitable number of cloud provider(s) 140 may be provided with some captive to a particular enterprise or otherwise not accessible to multiple domains.

Each of the cloud providers 140 may communicate with the public Internet using a secure connection. For example, the first cloud provider 140-1 may communicate with the public Internet 106 via the VPN 190, the second cloud provider 140-2 may communicate with the public Internet 106 via a different VPN 190, and the third cloud provider 140-3 may communicate with the public Internet 106 via yet another VPN 190. Some embodiments could use leased connections or physically separated connections to segregate traffic. Although one VPN 190 is shown, it is to be understood that there are many VPNs to support different end-user devices, tenants, domains, etc.

A plurality of enterprise(s) 198 may also communicate with the public Internet 106 and the end-user devices 195 for their domain via VPNs 190. Some examples of the enterprise(s) 198 may include corporations, educational facilities, governmental entities, and private consumers. Each enterprise may support one or more domains to logically separate its networks. The end-user devices 195 for each domain may include individual computers, tablets, servers, handhelds, and network infrastructure that are authorized to use computing resources of their respective enterprise(s) 198. In an embodiment, the cloud orchestration server 124 may be present inside the POP 104.

Further, the cloud orchestration server 124 may communicate with the public Internet 106 via the VPN 190. The cloud orchestration server 124 also provides cloud access security broker (CASB) functionality for cloud security to the enterprises 198 with data flows of the CASB being regulated with a global cloud traffic controller (GCTC). Communication between the cloud orchestration server 124 and the cloud provider(s) 140 for a given enterprise 198 can be either a VPN connection or tunnel depending on the preference of the enterprise 198. The cloud orchestration server 124 may configure, test, and enforce VM placement and configuration in hypervisors of the POPs 104 across the capacity resolver system 100. For example, the cloud orchestration server 124 may ensure that the policies for VM provisioning including vertical scaling and VM migration are consistent across the cloud providers 140, the enterprises 198 and computing environments 150. The cloud orchestration server 124 provides proxies to the cloud providers 140 and may apply various policies. The connection between the end-user devices 195 and the cloud orchestration server 124 is over an encrypted VPN 190 or tunnel.

Figure 2A:
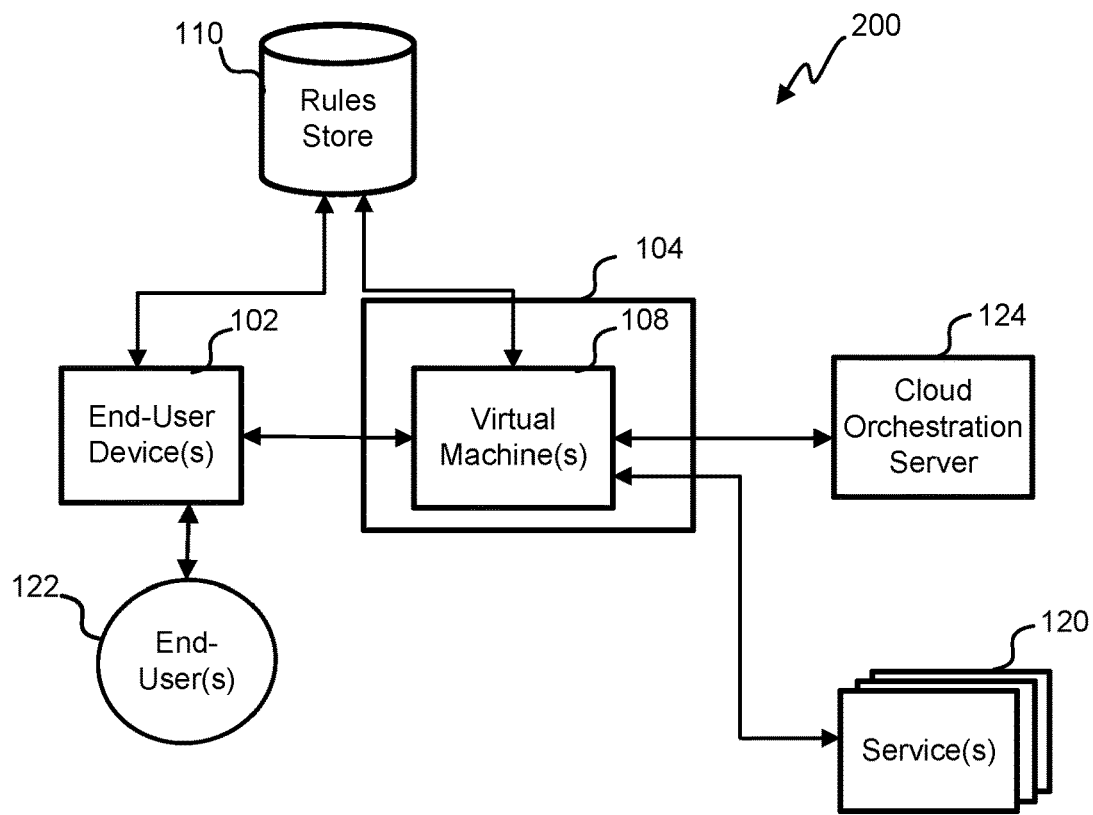
FIG. 2A illustrates a block diagram of an embodiment of a single tenant capacity resolver system where an end-user device communicates with a cloud provider.

With reference to FIG. 2A, a block diagram of an embodiment of a single-tenant capacity resolver system 200 where an end-user device 102 communicates with a cloud provider 140 is shown. The end-user device 102 is operated by an end-user 122. The cloud provider 140 is accessible directly or through the cloud orchestration server 124 depending on the route chosen, services, policies, etc. Included in the cloud provider 140 are the services 120 such as storage that enable applications and functionality on the end-user devices 102. The end-user devices 102 uses the virtual machines present at the POP 104 for deployment and use of the services 120. Tenant specific rules and policies are set for the end-user devices 102 and stored in a rules storage 110.

Figure 2B:
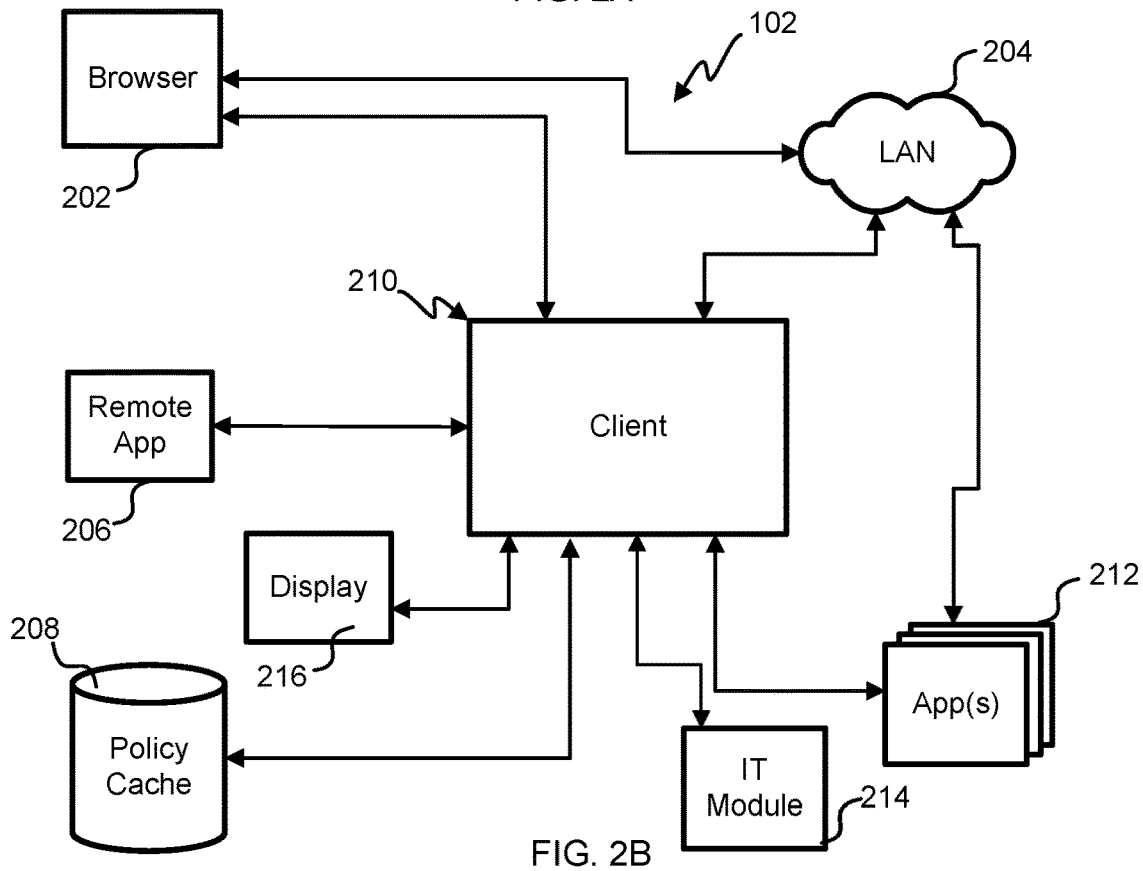
FIG. 2B illustrates a block diagram of an embodiment of an end-user device that includes a client for enabling enhanced routing control.

Referring next to FIG. 2B, a block diagram of an embodiment of an end-user device 102 that includes a client 210 for enabling enhanced routing control is shown. The end-user device 102 includes applications (apps) 212 and a browser 202 that use the client 210 for communication over the LAN 204 and in due course to the cloud provider(s) 140 (not shown). The browser 202 and the app(s) 212 can be redirected using domain name services (DNS) to use the client 210. Alternatively, the browser 202 and the app(s) 212 may natively support the client 210 to utilize Application Programming Interfaces (APIs) or other communication to select policies, and rules and receive the corresponding resolution of the capacity management of the nodes in the data centers. The policies corresponding to the tenants include rules, preferences, and priorities of provisioning VM based on a set of parameters. The set of parameters includes Central Processing Unit (CPU) cores, memory, disk space, and Virtual File System (VFS) availability of VMs in a Kernel Based Virtual Machine (KVM)/hypervisor of VMs 108. The policies are stored in a policy cache 208 which includes the policies retrieved from the rules storage 110. A remote app 206 is used to access a remote application on a remote instance of a remote server on the end-user device 102.

The provisioning of the VM in the data centers and the metrics involved in downsizing the VMs or migrating the VMs are displayed to the end-user(s) 122 including the end-user(s) 122 requesting a display 214. An Information Technology (IT) module 214 is used by the end-user(s) 122 to provide any feedback related to the optimization of VMs and the VM placement and configuration. The feedback is provided to an administrator of the enterprise(s) 198 of the end-user(s) 122. The feedback may include changes in policies or the VM placement conditions or changes in parameters and thresholds. The display 214 provides graphical depictions of VM capacity to the end-user(s) 122 and asks for suggestions and/or feedback which may be provided to the IT module 214.

Figure 3:
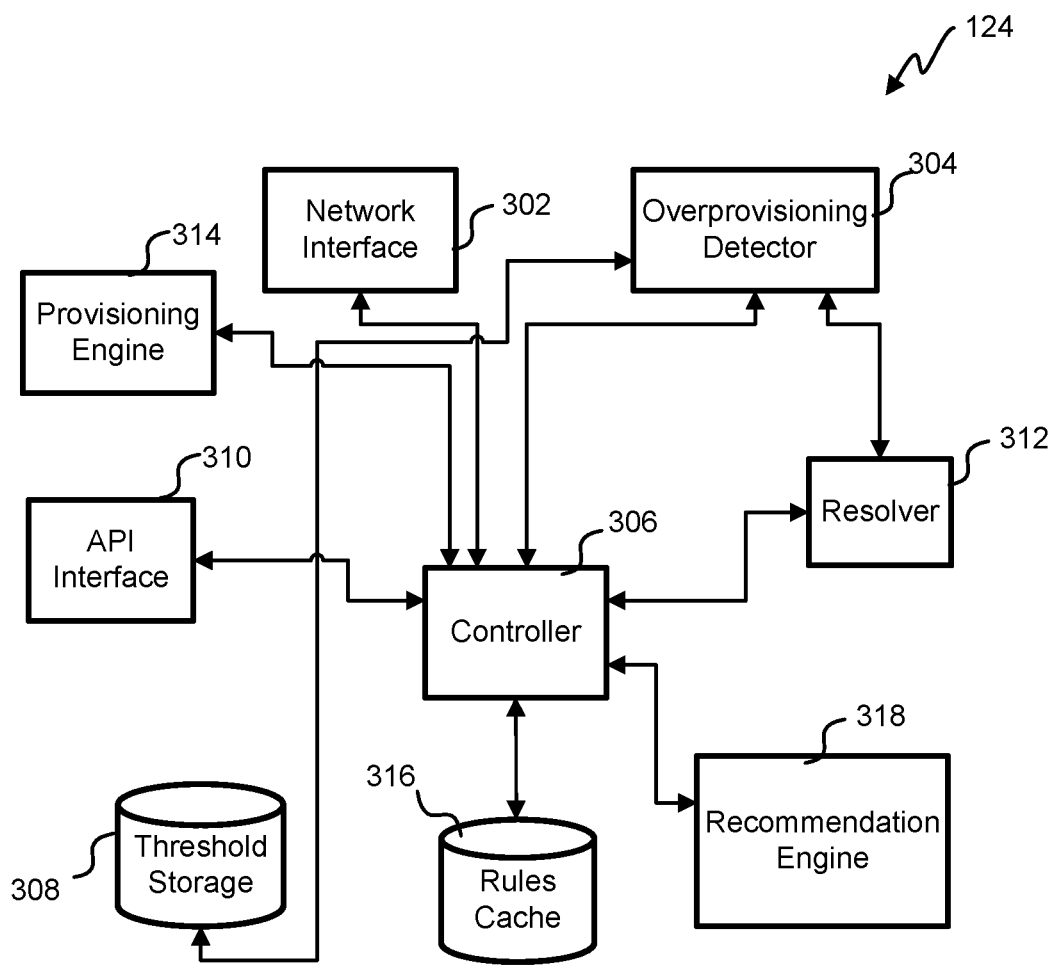
FIG. 3 illustrates a block diagram of an embodiment of a cloud orchestration server.

Referring next to FIG. 3, a block diagram of a cloud orchestration server 124 is shown. The cloud orchestration server 124 controls the VM provisioning and VM placement in the hypervisors or KVM of the POP 104. The cloud orchestration server 124 receives the request for provisioning a node or VM 108. The cloud orchestration server 124 considers various parameters to identify whether the request for placing the VM 108 in the KVM can be fulfilled or whether another KVM is entailed for placing the VM 108. The cloud orchestration server 124 includes a network interface 302, an overprovisioning detector 304, a controller 306, a threshold storage 308, an Application Programming Interface (API) 310, a resolver 312, a provisioning engine 314, a rules cache 316, and a recommendation engine 318.

The network interface 302 is used to receive requests for VM placement from the end-user device(s) 122 via a Domain Name System (DNS) interface. The network interface 302 is used for communication between the cloud orchestration server 124 and the end-user device(s) 122. The VM placement recommendations generated by the cloud orchestration server 124 are provided on the display 216 of the end-user device 102 for the end-users 122.

The controller 306 manages the components of the cloud orchestration server 124. The controller 306 performs VM provisioning that includes suggested placements for new VM(s) 108 (given the POP name, service group, and VM cores/memory/disk) by the recommendation engine 318. The controller 306 optimizes the VM configurations at existing POP 104, that is by resolving over-subscription by the overprovisioning detector 304.

The overprovisioning detector 304 identifies whether the KVMs are overprovisioned. The overprovisioning detector 304 compares the one or more parameters associated with the VMs for example, CPU cores, memory, disk space, and VFS availability with respective threshold values obtained from the threshold storage 308. The overprovisioning detector 304 identifies a triggering of the one or more parameters above the threshold values. The threshold values are predefined by the administrators of the enterprise(s) 198, the end-user(s) 122, and/or may be automatically defined by a machine learning algorithm based on current and past provisioning and utilization of the VMs 108 and stored in the threshold storage 308. A prediction to consumption of the one or more parameters may be identified by the machine learning algorithm. The triggering of the parameters is provided to the resolver 312 and the controller 306 for processing the requests.

In vertical scaling VMs of a service group that have very low utilization are considered candidates for downsizing. The downsizing refers to the reduction in provisioned cores and/or memory. The VMs may be selected for downsizing if doing so would directly reduce over-subscription or increase available provisioning space for new VMs 108.

Downsizing recommendations apply to all nodes/VMs 108 of a given service concurrently. Services are resized by a factor of one-half and then rounded up to the nearest exponent of 2 (for example, 6 cores are rounded down to 4, 15 GiB memory is rounded down to 8 GiB, etc). CPU provisioning cannot be reduced to below 1 core per VM. Services cannot be downsized more than once in 7 days. Utilization rates are measured over the past (for example 7 days) and are aggregated at a percentile (for example, the 99th percentile for core utilization and the 95th percentile) for memory utilization. Downsizing only applies to the resource that is determined to be underutilized (for example, if a service group is underutilized only in terms of cores, then its memory allocation would not be reduced as well). The terms 'service' or 'service group' refer to a proxy metric derived from the portion of the VM's hostname before the first period or numeric character.

In migrating VMs, the VMs 108 may be migrated from one KVM to another, if doing so would directly reduce over-subscription or increase available provisioning space. At existing POPs 104, migrating the VMs 108 is more burdensome than downsizing VMs 108, therefore, migrating VMs 108 is a secondary consideration only after all downsizing options have been exhausted.

On receiving the request for VM placement, the controller 302 uses the learning algorithm to provision the VM 108. The learning algorithm identifies a KVM for a new VM 108 to be provisioned based on its requisites of CPU cores, memory, and disk space. The learning algorithm identifies any VM migrations or downsizing necessary to create the necessary resource space for the assignment of the VM 108.

In a similar request for new VM placement, an upsize request is often made in response by the learning engine to a service whose nodes are overutilized at the POP 104. Rather than adding new VMs 108, vertical scaling is preferred. The service upsize use case leverages much of the same logic as the VM placement logic. The learning engine performs optimization of VM configuration by identifying VM migrations and downsizings to eliminate over-provisioning and increase the maximum available provisioning space. When a request for VM configuration for new POP 104 is received the learning algorithm identifies a VM configuration for a new POP 104. The learning algorithm would not perform actual migration or downsizing as the POP 104 is new.

The learning algorithm will suggest only the actions that are directly necessary to resolve the request. For example, when requesting a VM placement, the algorithm will omit an action such as downsizing a VM 108, if it does not directly prevent the VM 108 from being placed without causing an oversubscription not already present. The request is resolved in the minimum number of actions. There are several additional boundary conditions considered by the learning algorithm which include VMs that are to be excluded from downsizing or migration.

Oversubscription: No proposed action will introduce additional oversubscription (with respect to cores, memory, or disk space) to any KVMs in the configuration.

Anti-affinity: One potential provisioning risk is the over-concentration of the VMs 108 from the same service group within a single KVM. If the KVM were to fail, the entire service within the POP 104 may be jeopardized. The learning algorithm ensures VMs 104 are not overly concentrated.

Static VMs: Certain VMs 108 may not be feasibly migrated and/or downsized. These VMs are specified through configuration YAML Ain't Markup Language (YAML) files. Additionally, the VMs 108 with disk sizes greater than a specified threshold, and those with multiple external hard drives are not considered for migration.

Failover considerations: Certain services at certain POPs 104 may have intentionally low utilization so that they can absorb additional workloads in the event of a failover. These VMs 108 are treated differently and have separate, stricter utilization thresholds for downsizing.

Inactive VMs: Occasionally, VMs 108 are deactivated but still provisioned resources. If ignored, this presents a risk that the VMs 108 will subsequently be reactivated and its KVM may become oversubscribed as a result. The learning algorithm considers inactive VM provisioned memory and disk to be valid, but provisioned CPU cores to be invalid. Additionally, inactive VMs will not be recommended for migration.

The user inputs to the learning algorithm received from the end-user(s) 122 are:

POP Name
Hostname of requested VM
Requested VM Cores
Requested VM Memory
Requested VM Disk
Maximum iterations (for example, 30 by default)
List of KVMs to avoid placement on
List of VMs to not migrate and/or downsize
Service anti-affinity threshold (for example, 25% by default)
Cores and/or memory utilization threshold for downsizing candidates (for example, 12.5% by default)
Maximum migrate-able VM disk size (for example, 501 GiB by default)
Configuration Evaluation of VM 108:

If a configuration cannot accommodate a VM placement request in its initial state, the learning algorithm works to incrementally improve the configuration until it can be accommodated. A cost function is determined that serves to quantify the configuration with respect to the requested placement, essentially evaluating how far off a configuration is from a state that could accommodate the request. The four-dimensional cost function quantifies the resource difference between the current configuration and the closest configuration that would accommodate the requested VM placement.

For a given KVM, the four primary terms of the cost function quantify the insufficiency of each of the four resources necessary to provision the VM (CPU cores, memory, disk, and VFS). Because the four resources each have their units which cannot be directly compared, each term is normalized (indicated by each denominator) by a factor determined by the placement request itself e.g. the cores term is divided by the quantity of requested cores; the result is a unitless ratio that can be added along with other unitless terms. If a KVM can accommodate, for example, sufficient cores to place the VM then that term would be equal to zero, no term can have a negative value. A KVM with a lower cost function value is 'closer' to being able to accommodate the VM placement. The minimum aggregation of the equation indicates that each configuration is scored based on its KVM which has the lowest evaluation. If the cost function equates to 0 for any KVM, then the VM placement may occur (provided that anti-affinity or other boundary conditions don't invalidate this KVM). The cost function is:

$$f(c, m, d, v,) = \min\left[\frac{1}{4}\sqrt{\left(\frac{c_{gap_{kvm_i}}}{c_{req}}\right)^2 + \left(\frac{m_{gap_{kvm_i}}}{m_{req}}\right)^2 + \left(\frac{d_{gap_{kvm_i}}}{d_{req}}\right)^2 + \left(\frac{v_{gap_{kvm_i}}}{2}\right)^2}\right]$$

$$\text{Cores Ration*, } \frac{c_{gap_{kvm_i}}}{c_{req}} = \frac{\text{cores needed}}{\text{requested } VM \text{ cores}}$$

\* Ratio cannot be less than 0, c refers to CPU cores, m for memory, d for disk space, and v for VFS availability.

The specified cost function serves to identify whether each KVM can accommodate the placement request (if its value is equal to 0). Quantify the 'distance' between each KVM's current state and a state that could accommodate the placement request. Incorporate all four dimensions of the VM placement problem (cores, memory, disk and VFS) such that each is treated as equally imperative and normalized by a factor associated with the placement request itself. Evaluate whether potential configuration changes would result in being 'closer' or 'further away' from adequately accommodating the VM placement request.

There are four potential outcomes when attempting to place a VM 108.

Type 1: Placement successful with existing configuration. The existing configuration can accommodate VM placement without any entailed migrations or downsizings.

Type 2: Placement successful through service downsizing. The VM placement can be accommodated through one or more service downsizings. No VM migrations are entailed.

Type 3: Placement successful through a combination of downsizing and VM migrations. The VM placement can be accommodated through one or more VM migrations, possibly in addition to service downsizing.

Type 4: Placement unsuccessful. VM placement request cannot be accommodated given the boundary conditions of the capacity problem. All possible service downsizings and VM migrations have been considered (or the algorithm has reached its maximum iteration limit).

The outcomes from the learning engine are provided to the resolver 312 for further processing.

The resolver 312 uses the rules cache 316 that includes rules specifying conditions for downsizing and migration of VMs 108. The rules cache 316 includes tenant or enterprise(s) 198 set rules including policies, parameters, and threshold values for provisioning VMs 108. For example, for urgent requests, consider downsizing the VMs 108 else set a new VM 108 in another KVM. For normal requests, downsizing VMs or migrating VMs 108 may be considered. The rules cache 316 includes the rules from the rules store 110 and the policy cache 208. The resolver 312 determines whether downsizing or migration of the VMs 108 will accommodate the VMs 108 of the request. The determination is provided to the controller 302. The controller 302 uses the determination from the resolver 312 and the recommendations from the recommendation engine 318 to instruct the provisioning engine 314 to place and provision the VM 108 in the KVM accordingly.

The recommendation engine 318 provides recommendations to place the VMs 108 in the KVM of the POP 104 based on the analysis of the controller 306 using machine learning models. The machine learning models include machine learning algorithms that use the current and past VM provisioning from the controller 302 and suggest placements to the end-user(s) 122 on the display 214. The recommendation engine 318 also proposes initial VM configuration for new POP 104. The generation of recommended capacity solutions is fully automated. The recommendation engine 318 simplifies the resolution process for the end-user(s) 122 and reduces the amount of time needed to address capacity issues. The machine learning models access a fully developed data pipeline of VM provisioning and utilization data that is updated frequently. The machine learning model provides graphical depictions of VM capacity which informs end-user(s) 122 of the recommendations in detail.

The recommendation engine 318 proposes initial VM configuration for new POP 104. The controller 306 resolves the request for VM placement by two processes, vertical scaling or downsizing services and migrating VMs. Learning algorithms including machine learning algorithms or fuzzy logic or other algorithms may be used to resolve the request by vertical scaling or VM migration.

The API interface 310 can use commands to fetch data from the POP 104. For example, the API interface 310 can be used to collect data from the power supply at the POP 104 and the temperature sensor at the POP 104. The API interface 310 can also be used to collect data from a router used to receive data from the end-user device(s) 102 to the POP 104. In another embodiment, the API interface 310 can be used to collect data from the network interface 302 present at the POP location.

The provisioning engine 314 places and configures the VM 108 on the same KVM or another KVM or set up the VM as new VM 108 in the KVM based on the instructions from the controller 302. The provisioning engine 314 provides the status of placement of the VMs 108 in the KVM to the controller 302 which further displays it to the end-user(s) 122 on the display 214.

Figure 4:
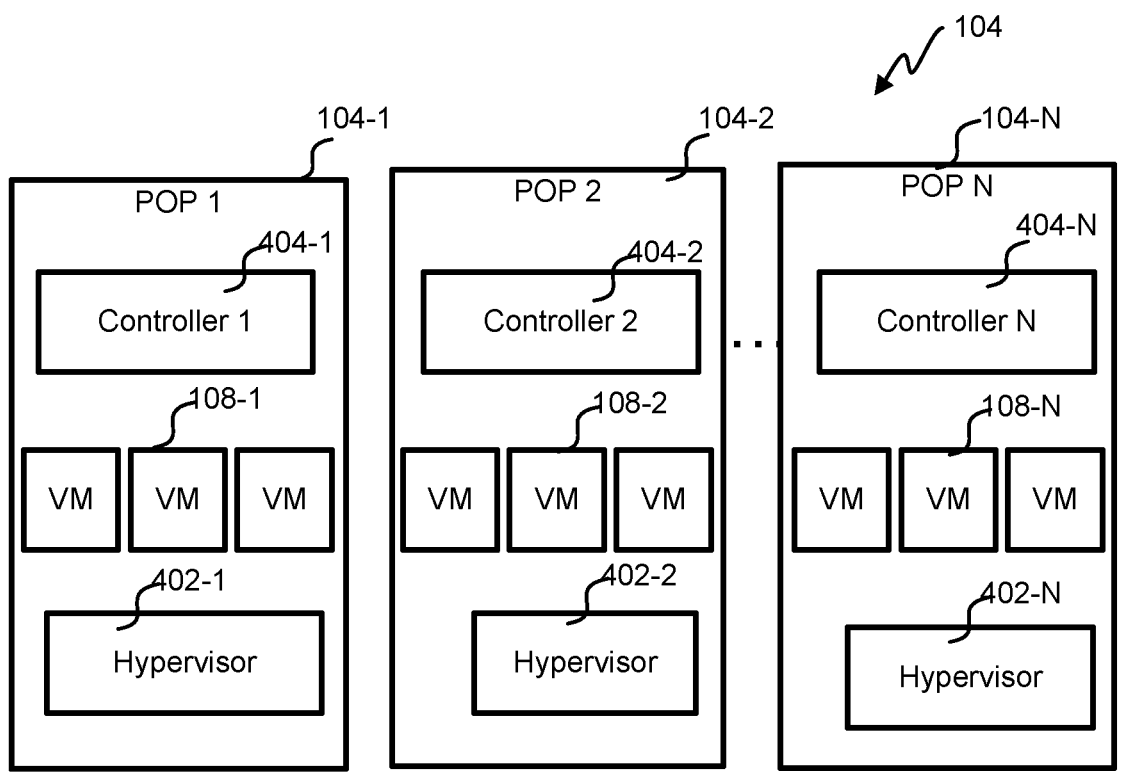
FIG. 4 illustrates an embodiment of a structural diagram of Point of Presence (POP) systems.

Referring next to FIG. 4, an embodiment illustrating a structural diagram of the POPs 104 is shown. The POPs 104 includes POP 104-1, 104-2, . . . 104-N, the POPs 104 include a controller 404 (404-1, 404-2, . . . 404-N), VMs 108 (108-1, 108-2, . . . 108-N) and hypervisors 402 (402-1, 402-2, . . . 402-N). N number of POPs 104 may be present. The hypervisor 402 is the KVM that includes the VMs 108 and provisions resources like CPU cores and memory for the functioning of the VMs 108. The controller 404 monitors the capacities of the hypervisor 402 and determines whether the hypervisor 402 can accommodate more VMs 108 or a new hypervisor 402 is needed to accommodate the VM 108. The operations and management of the hypervisor 402 and the VMs 108 are executed by the controller 404.

Figure 5A:
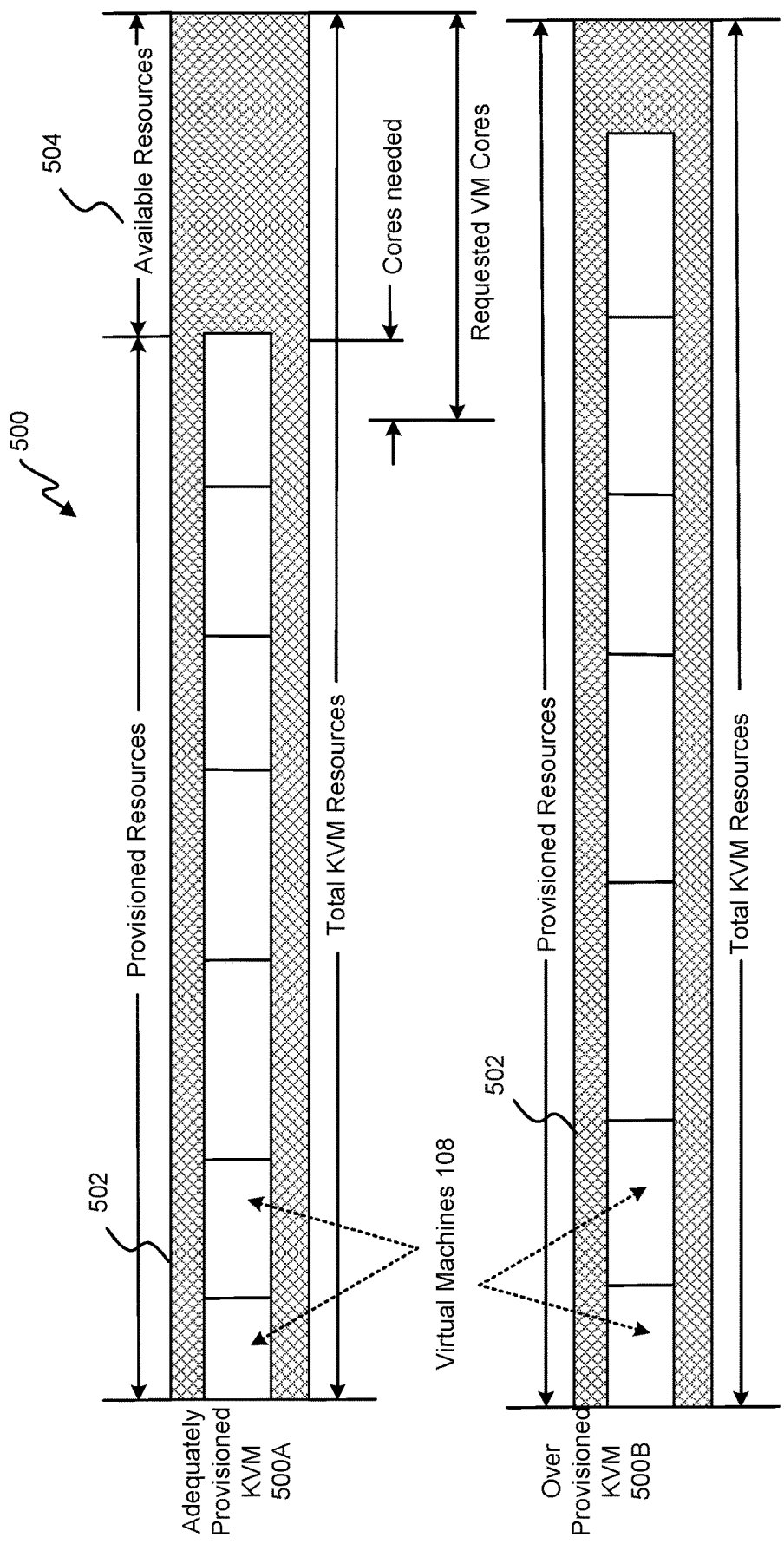
Figure 5C:
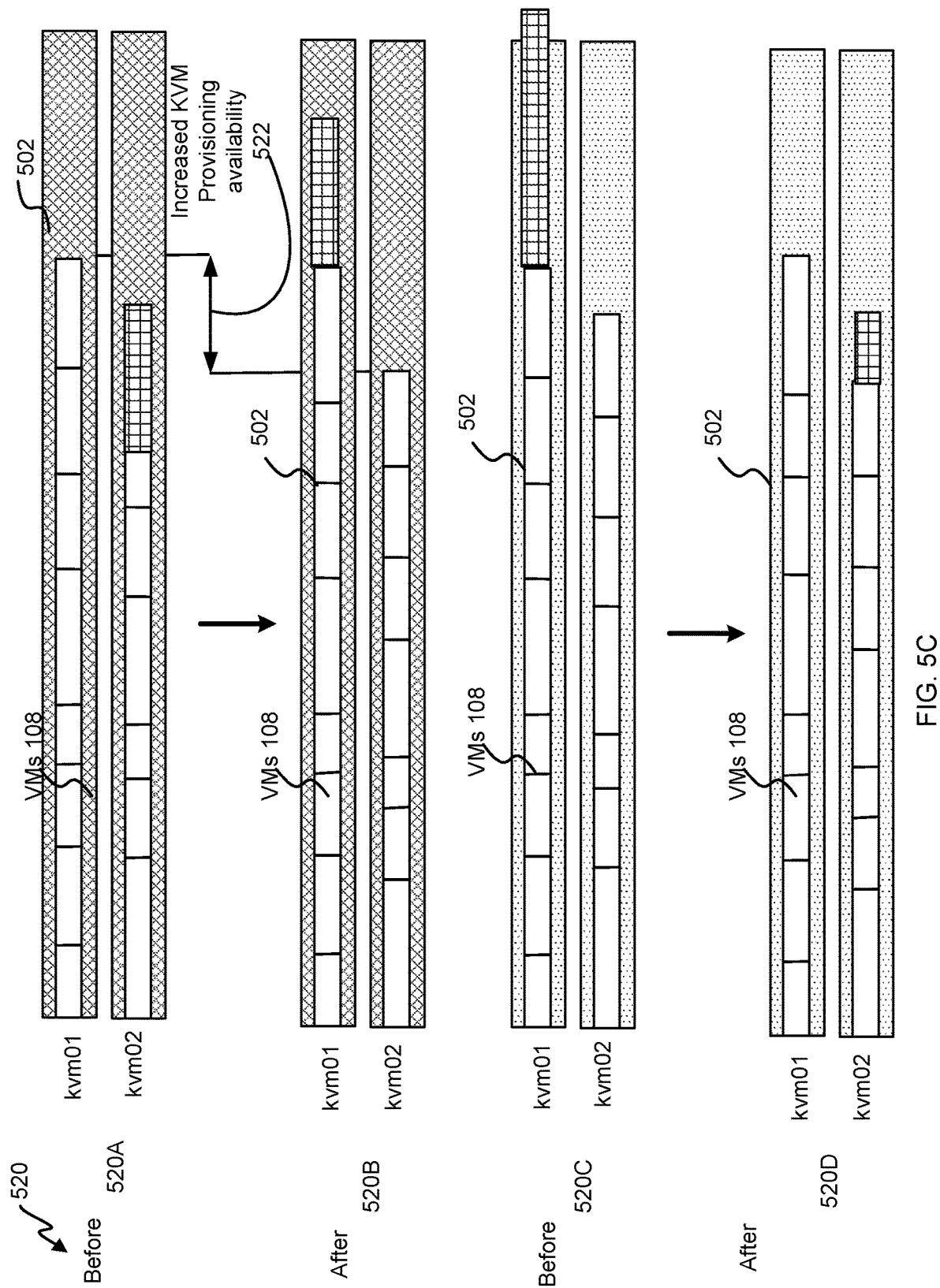

Referring next to FIGS. 5A-5C, a graphical representation of capacity management of VMs in the KVM 500 is shown. As illustrated in FIG. 5A, an adequately provisioned KVM 500A and an over-provisioned KVM 500B are shown. The adequately provisioned KVM 500A includes VMs 108 placed by downsizing the VMs 108 in the KVM 502 such that there is available space for resources 504. The available resources 504 may place more VMs. The over-provisioned KVM 500B has provisioned more resources (cores, memory, and/or disk) than it has to provide with the KVM 502 causing a risk of performance and stability issues. A portion of cores needed with respect to requested VM cores and available resources shows using cost function to assess the VM placement.

Referring next to FIG. 5B, an embodiment of downsizing and over-provisioning reduction 510 is shown. The KVM 502 including VMs 108 is shown. Service downsizing or vertical scaling refers to the reduction in provisioned cores and/or memory associated with the nodes of a common service at a given POP 104. The downsizing can be applied as a mechanism for creating additional KVM provisioning availability 512 on the KVM 502 as shown in KVM 510A with respect to KVM 510B. Reduction or resolve KVM oversubscription is shown in KVM 510C with respect to KVM 510D. An over-provisioning reduction 514 by reducing the overprovisioned VMs 108. VMs 108 of a service group that have very low utilization are considered candidates for downsizing. These VMs 108 may be selected for downsizing if doing so would directly reduce over-subscription or increase available provisioning space for new VMs 108. Service groups are considered candidates for downsizing if and only if all associated nodes have underutilization (core utilization, memory utilization, or both).

Referring next to FIG. 5C, an embodiment of a VM migration 520 in KVM is shown. The KVM 502 including VMs 108 is shown. Migration refers to the re-provisioning of a node/VM 108 from one KVM to another KVM. Similar to VM downsizing, VM migration can be applied to create additional KVM provisioning availability as shown in KVM 520A and KVM 520B. Increased KVM provisioning availability 522 shows the additional VM 108 placement space.

Reducing or resolving KVM oversubscription is shown in KVM 520C and KVM 520D. Migration of VMs 108 improves a configuration. However, the process of reprovisioning a VM 108 to its new KVM can last hours, potentially disrupting a service. In contrast, downsizing a service group can be accomplished without any disruption to the VMs 108. As a result, migrations are only a secondary consideration after all downsizing actions have been exhausted.

Figure 6:
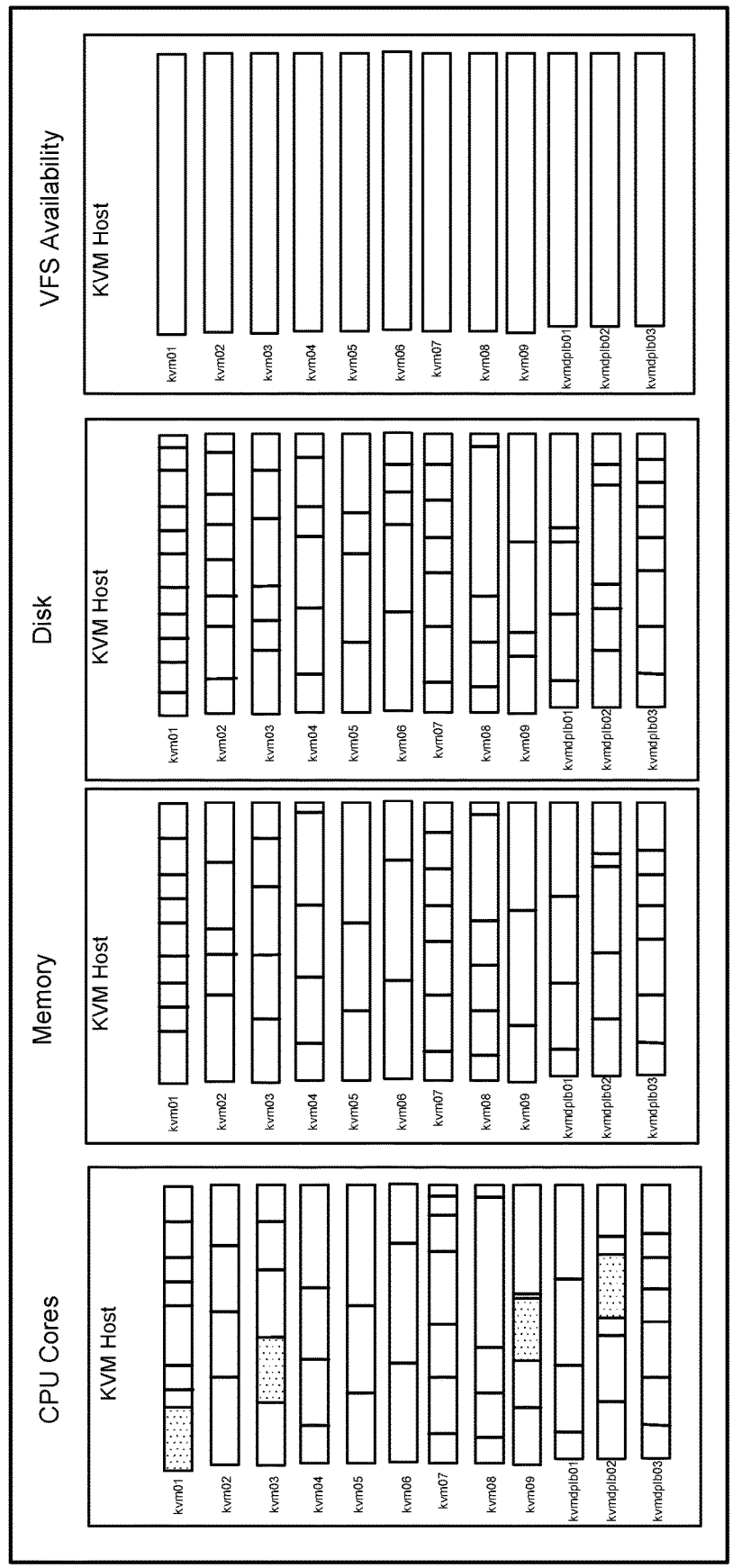
FIG. 6 illustrates a Graphical User Interface (GUI) illustrates a VM provisioning by a capacity resolver system displayed to an end-user and/or the administrator of an enterprise.

Referring to FIG. 6, a Graphical User Interface (GUI) 600 illustrates a VM provisioning by the capacity resolver system 100 displayed to the end-user(s) 122 and/or the administrator of the enterprise(s) 198 is shown. The GUI 600 is a visual representation of one or more parameters including CPU cores, memory, disk, and VFS availability. Each block represents one node. Each row is a KVM and then each of the columns here are the one or more parameters. There is a threshold limit of placing VMs in the hypervisor or KVM. When the threshold limit is exceeded, the capacity resolver 100 provides remedies in order to resolve the VM placement request.

Figure 7:
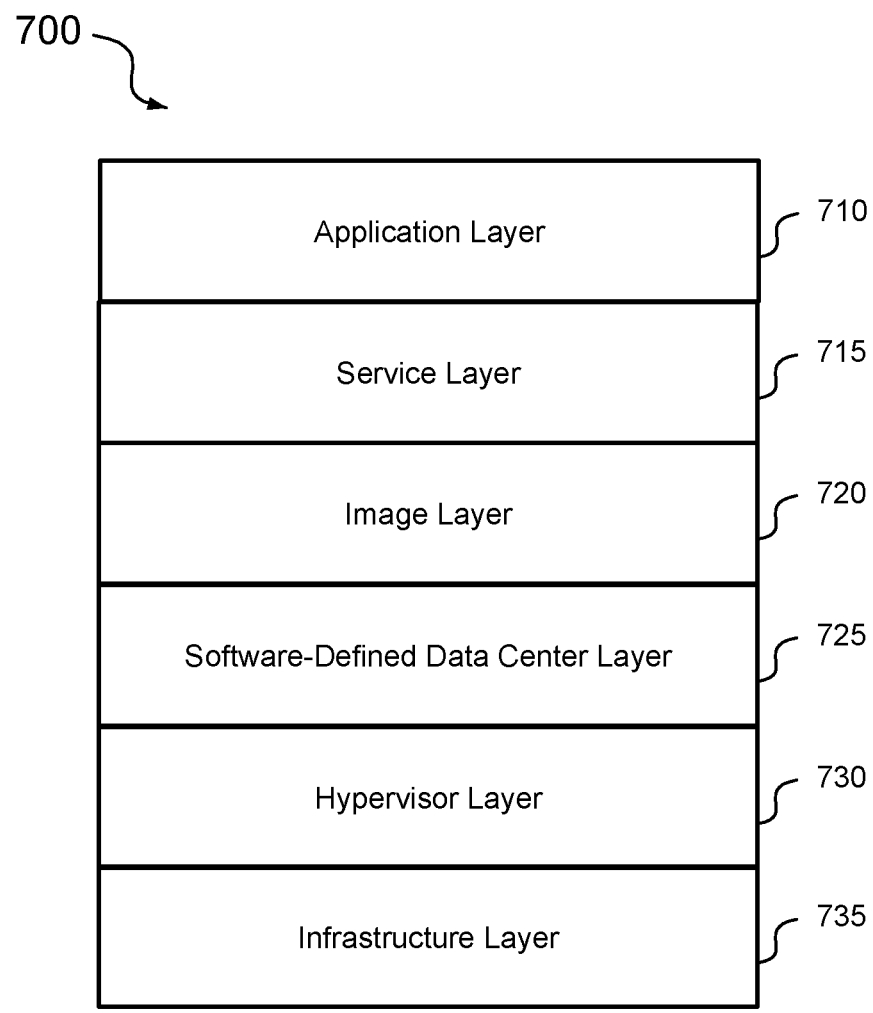
FIG. 7 illustrates a block diagram of an embodiment of an OSI model is shown.

Referring next to FIG. 7, a block diagram of an embodiment of an OSI model 700 is shown. The cloud OSI model 700 for cloud computing environments partitions the flow of data in a communication system into six layers of abstraction. The cloud OSI model 700 for cloud computing environments can include, in order, an application layer 710, a service layer 715, an image layer 720, a software-defined data center layer 725, a hypervisor layer 730, and an infrastructure layer 735. The respective layer serves a class of functionality to the layer above it and is served by the layer below it. Classes of functionality can be realized in software by various communication protocols.

The infrastructure layer 735 can include hardware, such as physical devices in a data center, that provides the foundation for the rest of the layers. The infrastructure layer 735 can transmit and receive unstructured raw data between a device and a physical transmission medium. For example, the infrastructure layer 735 can convert the digital bits into electrical, radio, or optical signals.

The hypervisor layer 730 can perform virtualization, which can permit the physical devices to be divided into virtual machines that can be bin packed onto physical machines for greater efficiency. The hypervisor layer 730 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 725 can provide resource pooling, usage tracking, and governance on top of the hypervisor layer 730. The software-defined data center layer 725 can enable the creation of virtualization for the Infrastructure-as-Code concept by using representational state transfer (REST) APIs. The management of block storage devices can be virtualized, and end-users can be provided with a self-service API to request and consume those resources which do not entail any knowledge of where the storage is deployed or on what type of device. Various compute nodes can be balanced for storage.

The image layer 720 can use various operating systems and other pre-installed software components. Patch management can be used to identify, acquire, install, and verify patches for products and systems. Patches can be used to correct security and functionality problems in software. Patches can also be used to add new features to operating systems, including security capabilities. The image layer 720 can focus on the compute in place of storage and networking. The instances within the cloud computing environments can be provided at the image layer 720.

The service layer 715 can provide middleware, such as functional components that applications use in tiers. In some examples, the middleware components can include databases, load balancers, web servers, message queues, email services, or other notification methods. The middleware components can be defined at the service layer 715 on top of particular images from the image layer 720. Different cloud computing environment providers can have different middleware components.

The application layer 710 can interact with software applications that implement a communicating component. The application layer 710 is the layer that is closest to the end-user. Functions of the application layer 710 can include identifying communication partners, determining resource availability, and synchronizing communication. Applications within the application layer 710 can include custom code that makes use of middleware defined in the service layer 715.

Various features discussed above can be performed at one or more layers of the cloud OSI model 700 for cloud computing environments. For example, translating the general policies into specific policies for different cloud computing environments can be performed at the service layer 715 and the software-defined data center layer 725. Various scripts can be updated across the service layer 715, the image layer 720, and the software-defined data center layer 725. Further, APIs and policies can operate at the software-defined data center layer 725 and the hypervisor layer 730.

Respective different cloud computing environments can have different service layers 715, image layers 720, software-defined data center layers 725, hypervisor layers 730, and infrastructure layers 735. Further, respective different cloud computing environments can have an application layer 710 that can make calls to the specific policies in the service layer 715 and the software-defined data center layer 725. The application layer 710 can have noticeably the same format and operation for respective different cloud computing environments. Accordingly, developers for the application layer 710 cannot need to understand the peculiarities of how respective cloud computing environments operate in the other layers.

Figure 8:
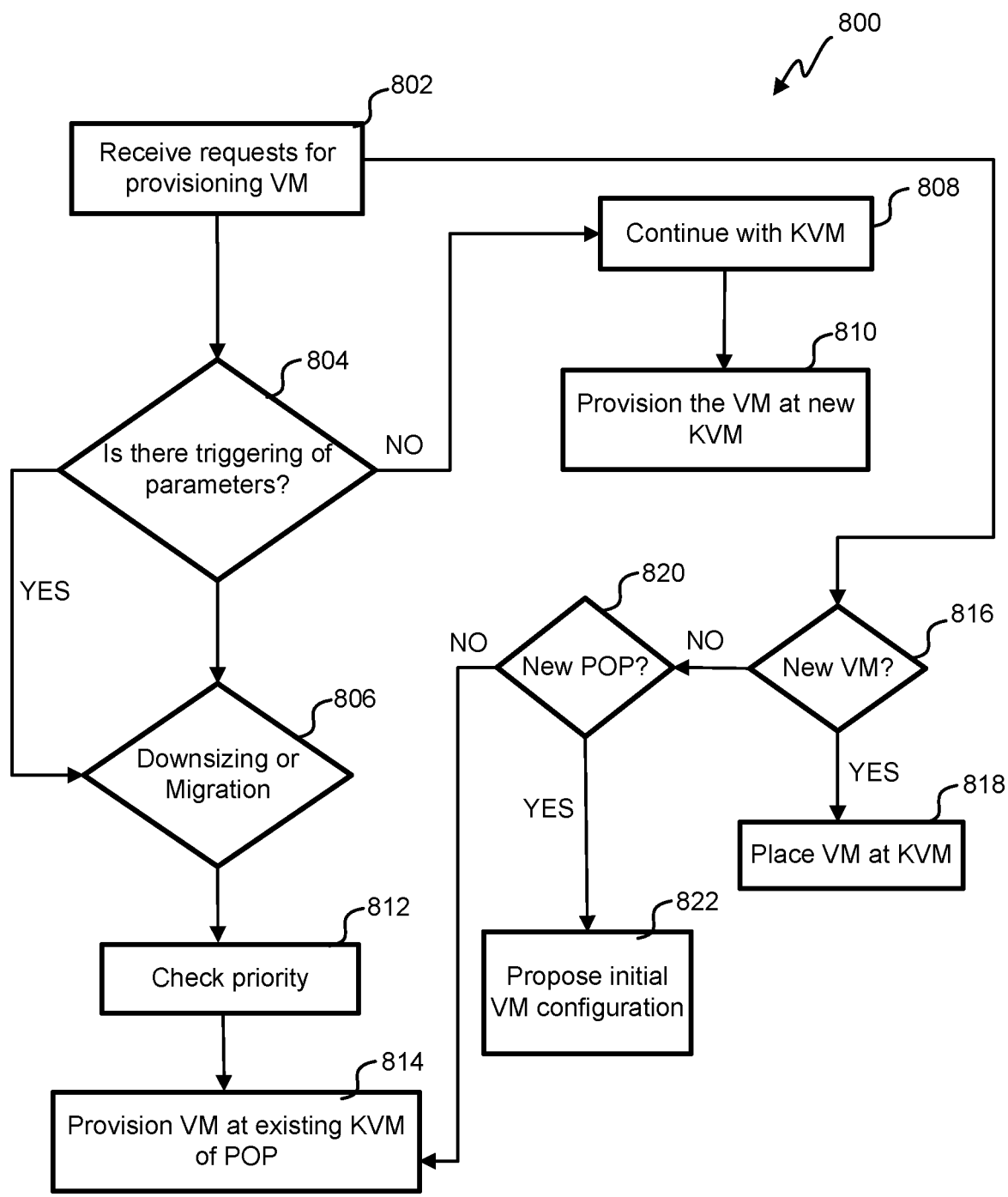
FIG. 8 illustrates a flowchart of a VM provisioning process including provisioning a VM or node at a hypervisor/KVM based on one or more parameters.

Referring next to FIG. 8, a flowchart of a VM provisioning process 800 including provisioning a VM or node at a hypervisor/KVM based on one or more parameters is shown. The VM provisioning process 800 starts at block 802 where requests for placing one or more VMs 108/nodes at a hypervisor/KVM are received. The request is received from an end-user(s) 122 via an end-user device(s) 102. The request is received at the cloud orchestration server 124 or at the POP 104. At block 804, a determination is made if one or more parameters are triggered at a KVM of the POP 104 where a requested VM 108 entails to be placed.

The one or more parameters include Central Processing Unit (CPU) core utilization, memory utilization, disk utilization and Virtual File System (VFS) availability associated with the VMs 108 of the KVM. There are four resources (including the one or more parameters) associated with each VM 108 and each KVM that define the problem of capacity management. KVMs have a certain amount of each resource which can be provisioned to one or more VMs including CPU cores, memory (typically expressed as GiB), disk space (typically expressed as GiB), Virtual File System (VFS) availability. An over-provisioned KVM has provisioned more resources (cores, memory, and/or disk) than it has to provide.

If the one or more parameters are not triggered at block 804, the request for placing the VM 108 continues with the new KVM in the same POP 104 or another POP 104. At block 810, the requested VM 108 is provisioned in the new KVM. A condition for downsizing or migration is checked at block 806.

Over-provisioning introduces the risk of performance and stability issues. The learning algorithm of the cloud orchestration server 124 performs the VM placement of the request by placing the requested VM 108 on the KVM of the POP 104. At block 806, based on the triggering of the one or more parameters, either vertical scaling (downsizing) or VM migration may be performed. At first vertical scaling is considered over VM migration. VMs 108 of a service group that have very low utilization of CPU cores, memory, disk, and VFS are considered for downsizing. In downsizing, the provisioned cores and/or memory are reduced in size. These VMs 108 may be selected for downsizing if doing so would directly reduce the overprovisioning or increase available provisioning space for the requested VM 108. In VM migration nodes 108 may be migrated from one KVM to another, if doing so would directly reduce over-subscription or increase available provisioning space.

At block 812, a priority of selecting vertical scaling (downsizing) or VM migration is determined. Initially, vertical scaling is considered however, if not possible or feasible, VM migration is considered in priority. The priority is determined by the cloud orchestration server 124 based on the reduction or downsizing of the parameters.

At block 814, the requested VM 108 is provisioned on the KVM of the existing POP 104 based on the priority by selecting downsizing or migration. The requested VM 108 is provisioned in the POP existing 104 by downsizing or migration.

At block 816, the requested VM 108 is determined to be a new VM 108. The VM configuration will depend on whether the requested VM 108 is new. For the new VM 108, the request already includes details for configuration like POP 104 name, service group, and VM cores/memory/disk. At block 818, the new VM 108 is provisioned on the given POP 104 based on the configuration details.

At block 820, if the VM 108 is not new, a determination is made whether the request includes configuration on a new POP 104. For the new POP 104 at block 822, the recommendation engine 318 of the cloud orchestration server 124, proposes initial configuration for the new POP 104 based on requisites and preferences of the end-user(s) 122 or the enterprise(s) 198 providing the request. If the requested VM 108 is neither a new VM 108 nor entails a new POP 104, the VM 108 will be provisioned on the KVM of the existing POP 104 at block 814.

Figure 9:
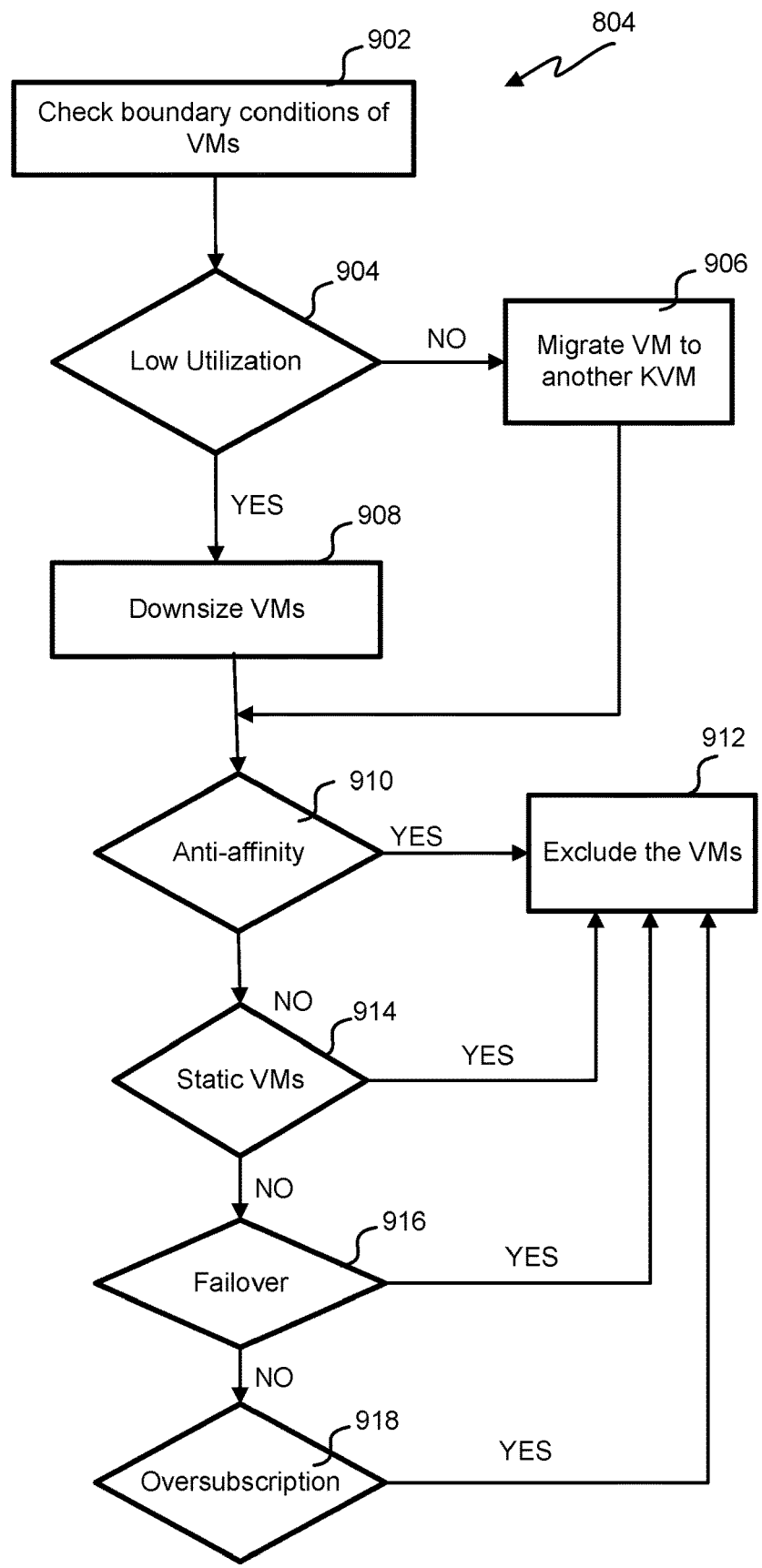
FIG. 9 illustrates a flowchart of determining the triggering of parameters of the VM provisioning process.

Referring next to FIG. 9, a flowchart of determining the triggering of parameters at block 804 of the VM provisioning process 800 is shown. The learning algorithm considers triggering of the one or more parameters for resolving the request for VM configuration and placement. However, there are other boundary conditions of the VMs 108 that the learning algorithm considers. At block 902, boundary conditions of VM 108 are determined including the one or more parameters like CPU cores, memory, disk, and VFS availability. At block 904, a low utilization of these parameters of the VMs 108 in the KVMs is determined by the learning algorithm. If there is low utilization of these parameters then at block 908, the VMs 108 in the KVMs are downsized so that the requested VM 108 can be accommodated.

If the utilization of the parameters at the KVMs is not low and there is no space for accommodating the requested VM 108, then at block 906, the requested VM 108 is migrated to another KVM of another POP 104. At block 910, other parameters of the boundary conditions of the VMs 108 are determined. Anti-affinity presence is determined, the anti-affinity includes over-concentration of VMs from the same service group within a single KVM. Each VM 108 is associated with a service/kind and the learning algorithm ensures the VMs 108 are not overly concentrated. Within a given POP 104, provisioning a large portion of VMs 108 with a shared service to the same KVM represents an unnecessary risk for that service. In the event that the KVM were to shut down, the service would be significantly impacted. To mitigate this risk, it is pertinent to diversify the KVM assignments for the VMs 108 with a common service. Multiple VMs 108 with a shared service cannot be provisioned to the same KVM unless the count of VMs 108 represents less than a determined amount of all the VMs 108 associated with the service at that POP 104. Based on the presence of the anti-affinity at block 912, the VMs 108 are excluded from downsizing or migration.

At block 914, presence of static VMs 108 is determined and if present excluded from downsizing or migration at block 912. The static VMs 108 may not be feasibly migrated and/or downsized. These VMs 108 are specified through configuration YAML files. Additionally, VMs 108 with disk sizes greater than a specified threshold, and those with multiple external hard drives are not considered for migration. Migration of the VMs 108 with sufficiently large disk space requisites and those with multiple external disks are significantly more challenging and time consuming. For this reason, the learning algorithm will not recommend migrating these VMs 108.

At block 916, failover considerations are determined and if present excluded from downsizing or migration at block 912. The failover considerations include certain services at certain POPs 104 that have intentionally low utilization so that they can absorb additional workloads in the event of a failover. There are a number of services/kinds that should not be migrated or downsized for various other reasons. These VMs 108 are treated differently and are not selected for downsizing.

Further, inactive VMs 108 include VMs 108 that are deactivated but still provisioned resources. If ignored, this presents a risk that the VMs 108 will subsequently be reactivated and its KVM may become oversubscribed as a result. The learning algorithm considers inactive VM provisioned memory and disk to be valid, but provisioned CPU cores to be invalid. Additionally, inactive VMs will not be recommended for migration.

At block 918, oversubscription is determined. No proposed action will introduce additional oversubscription (with respect to cores, memory, or disk space) to any KVMs in the configuration else the VMs will be excluded from downsizing or migration at block 912.

Figure 10:
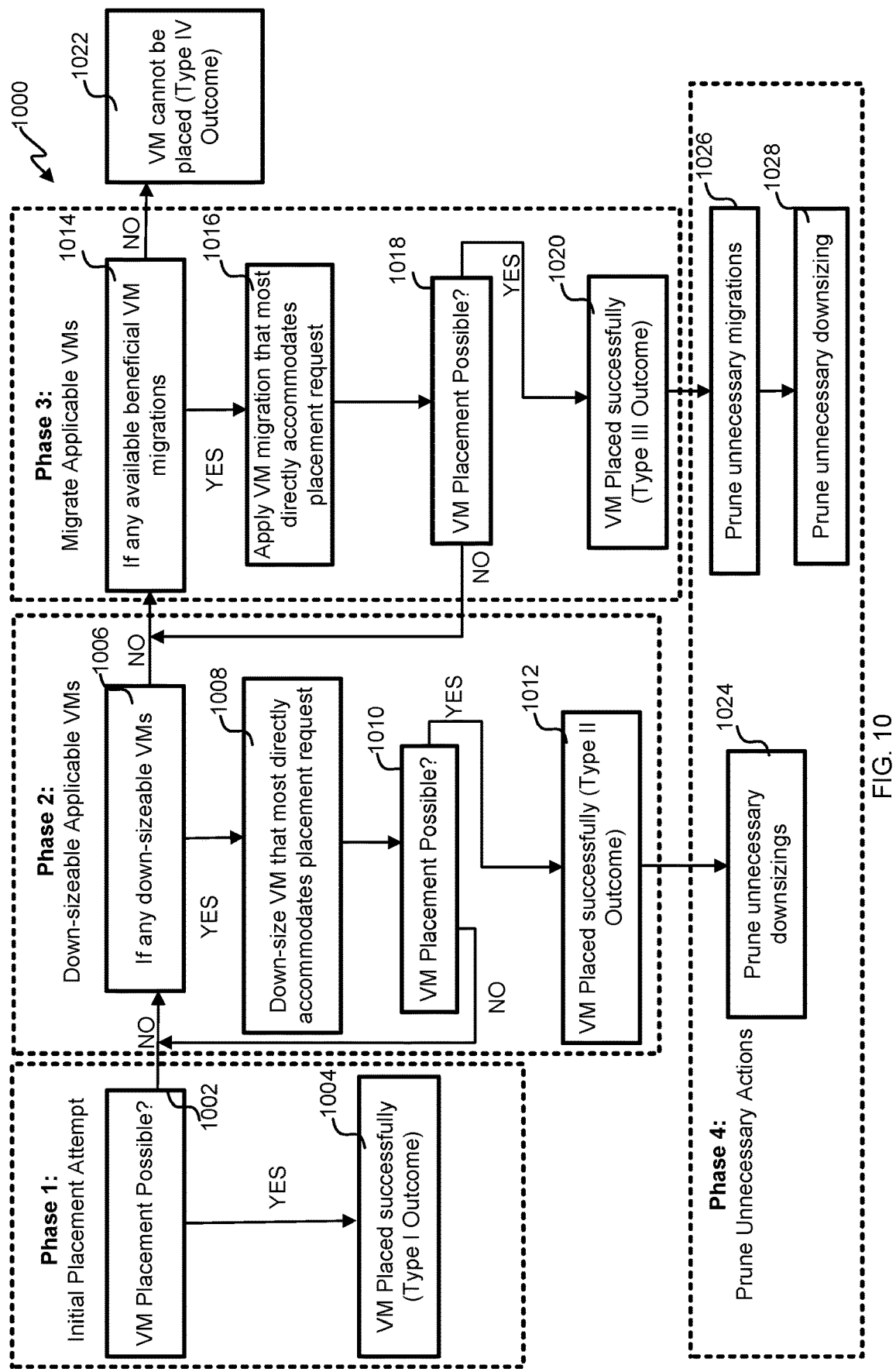
FIG. 10 illustrates a flowchart of a VM placement process including VM placement phases.

Referring next to FIG. 10, a flowchart of a VM placement process 1000 including VM placement phases is shown. The VM placement process 1000 begins at block 1002 where phase 1 initiates. Phase 1 includes the initial placement attempt of requested VM 108 in the KVM of the POP 104. The learning algorithm performs the phase 1 analysis. The learning algorithm initiates with an attempt to place the VM 108 in the KVM configuration. If the VM placement is possible at the KVM, the placement is made, and no further logic is applied at block 1004 as VM 108 is successfully placed in the KVM. If multiple KVMs could accommodate the placement, the algorithm places preference on anti-affinity firstly and 'completing a KVM' secondly. If a triggering of the parameters is determined, then the process moves to phase 2 that is downsizing the VMs 108.

If an initial configuration cannot accommodate the placement request, the learning algorithm will attempt to resolve the request exclusively through service downsizings in phase 2. At block 1006, a determination is made to check if there is any downsize able VMs 108 are available to accommodate the requested VM 108. If there is a downsize able VM 108 then at block 1008, the VM 108 is downsized that most directly accommodates VM placement request.

At block 1010, VM placement is determined and if possible, then at block 1012, the requested VM 108 is successfully placed at the KVM else the process moves to find another downsize able VM at block 1006. The algorithm sequentially applies downsizings in order of maximum benefit until the placement can be accommodated or until all candidate services have been downsized. Only once all downsizing options have been exhausted, the learning algorithm considers VM migrations at phase 3. The process ended by pruning unnecessary downsizing at phase 4 at block 1024.

At block 1014, VM migrations are determined. VMs 108 are determined for migrations by the learning algorithm and if the VM 108 is determined for migration then at block 1016, VM migration that most directly accommodates placement request is applied. At block 1018, after VM migration, the requested VM placement is checked at block 1018 and finally, the requested VM 108 is placed at block 1020. To avoid recursive loops, the same VM 108 cannot be moved to a KVM that was already moved off. Migrations are applied until either the placement can be accommodated, the algorithm fails to converge, or a user-specified maximum iteration threshold is reached at block 1022 or at phase 4 at block 1026 and at block 1028 where unnecessary migrations and downsizing are pruned respectively.

Phase 4: Pruning unnecessary actions: If either phases 2 or 3 result in successful VM placement a final pruning step is applied. While the learning algorithm helps to guide the configuration iteratively towards an acceptable state, there are cases where the path is not maximally efficient. This is imperative because configuration changes can be lengthy and disruptive. It is highly desirable to identify the solution with minimal number of actions needed (particularly with respect to VM migrations). After placement is achieved, the algorithm will work iteratively backwards to evaluate whether any individual action could be omitted entirely, or whether any pair of actions could be replaced with a single action. Actions are pruned only if doing so would not cause additional over provisioning in the configuration or otherwise violate a boundary condition such as anti-affinity.

Multiple VM Placements: Often, requests necessitate the placement of two or more nodes of the same service at a given POP 104. To accommodate these requests, the learning algorithm applies the logic described above iteratively for each individual VM placement, while updating the configuration to reflect the associated downsizings, migrations and placement at each step. At the end of the placement of all requested nodes (if feasible), the algorithm triggers one additional pruning step to reduce unnecessary actions that have been recommended across different VM placements.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

What is claimed is:

1. A capacity resolver system for provisioning and management of nodes at point of presence (POP) systems in a cloud-based multi-tenant system, the capacity resolver system comprises:
 a plurality of POPs including a plurality of hypervisors, the plurality of hypervisors includes a plurality of nodes; and
 a cloud orchestration server configured to:
  receive a request for provisioning a node in a POP of the plurality of POPs, wherein:
   the request is provisioned at the POP based on a plurality of parameters,
   the cloud orchestration server receives the plurality of parameters from the plurality of hypervisors of the POP, and
   the plurality of parameters includes Central Processing Unit (CPU) Core utilization, memory utilization, disk utilization and Virtual File System (VFS) availability of the plurality of nodes of a hypervisor;
  determine if there is a triggering of one or more parameters from the plurality of parameters at the POP, wherein the determination of the triggering of the one or more parameters includes a determination of the one or more parameters are above respective threshold values,
  identify a condition for downsizing or migration of one or more nodes of the plurality of nodes based on the triggering of the one or more parameters;
  determine an anti-affinity condition including over-concentration of nodes from a same service group within the hypervisor by determining whether a count of the one or more nodes is less than an amount of a set of nodes associated with the same service group of the hypervisor, wherein based on the determination of the anti-affinity condition, the one or more nodes are excluded from the downsizing or the migration at the hypervisor;
  identify a priority for the downsizing or the migration of the one or more nodes based on the condition; and
  provision the node at the hypervisor of the POP based on the downsizing or the migration of the one or more nodes in accordance with the priority and determination of the anti-affinity condition.

2. The capacity resolver system for provisioning and management of nodes at point of presence (POP) systems in a cloud-based multi-tenant system as recited in claim 1, wherein the plurality of nodes are virtual machines and the plurality of hypervisors are a Kernel Based Virtual Machine (KVM).

3. The capacity resolver system for provisioning and management of nodes at point of presence (POP) systems in a cloud-based multi-tenant system as recited in claim 1, wherein the provisioning of the node and determination of the downsizing or the migration of the one or more nodes is performed at an application layer.

4. The capacity resolver system for provisioning and management of nodes at point of presence (POP) systems in a cloud-based multi-tenant system as recited in claim 1, wherein the cloud orchestration server is further configured to prune the downsizing or the migration of the one or more nodes based on the provisioning of the node.

5. The capacity resolver system for provisioning and management of nodes at point of presence (POP) systems in a cloud-based multi-tenant system as recited in claim 1, wherein a learning algorithm is used for the determination of the condition for downsizing or the migration of the one or more nodes.

6. The capacity resolver system for provisioning and management of nodes at point of presence (POP) systems in a cloud-based multi-tenant system as recited in claim 1, wherein boundary conditions to the provisioning of the node includes the anti-affinity condition, static nodes that are not feasible for the migration and/or downsizing, nodes with low utilization during failover, and inactive nodes.

7. The capacity resolver system for provisioning and management of nodes at point of presence (POP) systems in a cloud-based multi-tenant system as recited in claim 1, wherein recommendations are generated for placing the node based on current and past virtual machine (VM) provisioning.

8. A method for capacity management of nodes at point of presences (POPs) in a cloud-based multi-tenant system, the method comprising:
   receiving a request at a cloud orchestration server for provisioning a node in a POP, wherein:
      the request is provisioned at the POP based on a plurality of parameters,
      the cloud orchestration server receives the plurality of parameters from a plurality of hypervisors of the POP, and
      the plurality of parameters includes Central Processing Unit (CPU) Core utilization, memory utilization, disk utilization and Virtual File System (VFS) availability of a plurality of nodes of a hypervisor;
   determining if there is a triggering of one or more parameters from the plurality of parameters at the POP, wherein determining triggering of the one or more parameters includes determining if the one or more parameters are above respective threshold values;
   identifying a condition for downsizing or migration of one or more nodes based on the triggering of the one or more parameters;
   determine an anti-affinity condition including over-concentration of nodes from a same service group within the hypervisor by determining whether a count of the one or more nodes is less than an amount of a set of nodes associated with the same service group of the hypervisor, wherein based on the determination of the anti-affinity condition, the one or more nodes are excluded from the downsizing or the migration at the hypervisor;
   identifying a priority for the downsizing or the migration of the one or more nodes based on the condition; and
   provisioning the node at the hypervisor of the POP based on the downsizing or the migration of the one or more nodes in accordance with the priority and determination of the anti-affinity condition.

9. The method for capacity management of nodes at point of presences (POPs) in a cloud-based multi-tenant system, as recited in claim 8, wherein the plurality of nodes are virtual machines and the plurality of hypervisors are a Kernel Based Virtual Machine (KVM).

10. The method for capacity management of nodes at point of presences (POPs) in a cloud-based multi-tenant system, as recited in claim 8, wherein the provisioning of the node and determination of the downsizing or the migration of the one or more nodes is performed at an application layer.

11. The method for capacity management of nodes at point of presences (POPs) in a cloud-based multi-tenant system, as recited in claim 8, further comprising pruning, the downsizing or the migration of the one or more nodes based on the provisioning of the node.

12. The method for capacity management of nodes at point of presences (POPs) in a cloud-based multi-tenant system, as recited in claim 8, wherein a learning algorithm is used for the determination of the condition for downsizing or the migration of the one or more nodes.

13. The method for capacity management of nodes at point of presences (POPs) in a cloud-based multi-tenant system, as recited in claim 8, wherein exceptions to the provisioning of the node includes the anti-affinity condition, static nodes that are not feasible for the migration and/or downsizing, nodes with low utilization during failover, and inactive nodes.

14. The method for capacity management of nodes at point of presences (POPs) in a cloud-based multi-tenant system, as recited in claim 8, wherein recommendations are generated for placing the node based on current and past virtual machine (VM) provisioning.

15. The method for capacity management of nodes at point of presences (POPs) in a cloud-based multi-tenant system, as recited in claim 8, wherein rules specifying conditions for the downsizing and the migration of a plurality of nodes are set by an administrator of an enterprise and/or an end-user of the request.

16. A capacity resolver system for managing capacity of nodes at point of presence (POPs) systems based on boundary conditions, the capacity resolver system comprising a plurality of servers, collectively having code for:
   receiving a request at a cloud orchestration server for provisioning a node in a POP, wherein:
      the request is provisioned at the POP based on a plurality of parameters,
      the cloud orchestration server receives the plurality of parameters from a plurality of hypervisors of the POP, and
      the plurality of parameters includes Central Processing Unit (CPU) Core utilization, memory utilization, disk utilization and Virtual File System (VFS) availability of a plurality of nodes of a hypervisor;
   determining if there is a triggering of one or more parameters from the plurality of parameters at the POP, wherein determining triggering of the one or more parameters includes determining if the one or more parameters are above respective threshold values;
   identifying a condition for downsizing or migration of one or more nodes based on the triggering of the one or more parameters;

determine an anti-affinity condition including over-concentration of nodes from a same service group within the hypervisor by determining whether a count of the one or more nodes is less than an amount of a set of nodes associated with the same service group of the hypervisor, wherein based on the determination of the anti-affinity condition, the one or more nodes are excluded from the downsizing or the migration at the hypervisor;

identifying a priority for the downsizing or the migration of the one or more nodes based on the condition; and provisioning the node at the hypervisor of the POP based on the downsizing or the migration of the one or more nodes in accordance with the priority and determination of the anti-affinity condition.

17. The capacity resolver system for managing capacity of nodes at point of presence (POPs) systems based on boundary conditions as recited in claim 16, wherein the provisioning of the node and the determination of the downsizing or the migration of the one or more nodes is performed at an application layer.

18. The capacity resolver system for managing capacity of nodes at point of presence (POPs) systems based on boundary conditions as recited in claim 16, further comprising pruning, the downsizing or the migration of the one or more nodes based on the provisioning of the node.

19. The capacity resolver system for managing capacity of nodes at point of presence (POPs) systems based on boundary conditions as recited in claim 16, wherein recommendations are generated for placing the node based on current and past virtual machine (VM) provisioning.

20. The capacity resolver system for managing capacity of nodes at point of presence (POPs) systems based on boundary conditions as recited in claim 16, wherein rules specifying conditions for the downsizing and the migration of the one or more nodes are set by an administrator of an enterprise and/or an end-user of the request.

* * * * *